(12) United States Patent
Hays et al.

(10) Patent No.: US 8,230,448 B2
(45) Date of Patent: Jul. 24, 2012

(54) METHODS, SYSTEMS AND COMPUTER PROGRAM PRODUCTS FOR WEB SERVICE INTERACTION WITH A RESOURCE MANAGEMENT SYSTEM

(75) Inventors: Garve Hays, Cypress, TX (US); Roger Glenn Huebner, Sugar Land, TX (US)

(73) Assignee: NetIQ Corporation, Houston, TX (US)

( * ) Notice: Subject to any disclaimer, the term of this patent is extended or adjusted under 35 U.S.C. 154(b) by 1384 days.

(21) Appl. No.: 11/745,665

(22) Filed: May 8, 2007

(65) Prior Publication Data

US 2007/0266035 A1    Nov. 15, 2007

Related U.S. Application Data

(60) Provisional application No. 60/746,805, filed on May 9, 2006.

(51) Int. Cl.
G06F 11/30 (2006.01)
(52) U.S. Cl. .................. 719/320; 719/316; 709/223
(58) Field of Classification Search .................. None
See application file for complete search history.

(56) References Cited

U.S. PATENT DOCUMENTS

| | | | |
|---|---|---|---|
| 6,862,736 | B2 | 3/2005 | Hudis et al. |
| 7,043,738 | B2 | 5/2006 | Mandal et al. |
| 2002/0156865 | A1* | 10/2002 | Rajarajan et al. ............ 709/217 |
| 2003/0204557 | A1* | 10/2003 | Mandal et al. ............... 709/202 |
| 2003/0217195 | A1* | 11/2003 | Mandal et al. ............... 709/330 |
| 2004/0230674 | A1* | 11/2004 | Pourheidari et al. .......... 709/223 |
| 2005/0182843 | A1* | 8/2005 | Reistad et al. ............... 709/230 |
| 2006/0069774 | A1* | 3/2006 | Chen et al. ................... 709/225 |

OTHER PUBLICATIONS

Carl Kesselman, CIM and the Open Grid Services Architecture, Jul. 21, 2002, pp. 1-5.*

Jason Cornpropst, Proposal for a CIM mapping to WSDM, Version 1.0, Jan. 7, 2005.*

Flon et al.; *Charter of the CIM Based Grid Information Services Working Group*; Version 0.3, Jul. 17, 2002; Daasi.de/wgs/.../CIMGIS_charter_v0.3.html; printed Jan. 24, 2012.

* cited by examiner

*Primary Examiner* — S. Sough
*Assistant Examiner* — Syed Roni
(74) *Attorney, Agent, or Firm* — Myers Bigel Sibley & Sajovec, P.A.

(57) ABSTRACT

Some embodiments of the present invention provide resource management systems, methods and computer program products that support web services by identifying a web service as an object in a common information model. Additional embodiments of the present invention provide systems, methods and computer program products that provide web services from an object-oriented resource management system using a published web services description, e.g., a WSDL file.

9 Claims, 8 Drawing Sheets

METHODS, SYSTEMS AND COMPUTER PROGRAM PRODUCTS FOR WEB SERVICE INTERACTION WITH A RESOURCE MANAGEMENT SYSTEM

RELATED APPLICATION

This application claims the benefit of and priority to U.S. Provisional Patent Application No. 60/746,805, entitled "PROVIDING RUN-TIME WEB SERVICE ACCESS TO PROPRIETARY SERVICES," filed May 9, 2006, the disclosure of which is hereby incorporated herein by reference as if set forth in its entirety.

BACKGROUND OF THE INVENTION

The present invention, generally, relates to computer networks and, more particularly, to methods, systems and computer program products for managing such computer networks.

Object-oriented models may be used to describe management information in a network/enterprise environment. Such object-oriented information models, for example, the Common Information Model (CIM) by Distributed Management Task Force (DMTF) and the NetIQ Common Information Model (IQCIM) by NetIQ Corporation, have become increasingly more critical in enabling different management products from different vendors to exchange semantically rich management information via computer networks. CIM is discussed at world wide web address wbemsolutions.com/tutorials/CIM/.

Object-oriented common information models, such as CIM and IQCIM, represent managed resources and their aggregate functions/services as object classes and associations. Object classes correspond to "things," i.e., logical and/or physical entities, which have associated properties and functions (methods). Associations describe logical relationships among objects.

Web services are distributed application components that are configured to interoperate over the Internet using message passing. Typically, web services are self-contained and self-describing. For example, a web service may be a reusable application component that offers operations, such as currency conversion, weather reports or language translation. These components may be used by applications, which pass requests to the web service to perform its particular operation(s). Web services may also be used to exchange data between different applications and different platforms.

The Web Services Definition Language (WSDL) is a language based on eXtensible Markup Language (XML) that is used to describe how to communicate with web services. WSDL defines services as collections of network endpoints, or ports. A WSDL document is an XML document that describes a web service, including the web service ports and messages. A port is defined by associating a network address with a reusable binding, and a collection of ports define a service. Messages are abstract descriptions of the data being exchanged, and port types are abstract collections of supported operations. The concrete protocol and data format specifications for a particular port type constitutes a reusable binding, where the messages and operations are then bound to a concrete network protocol and message format. In this way, WSDL describes the public interface to the web service.

WSDL is typically used in combination with SOAP (Service Oriented Architecture Protocol) and XML schema to provide web services. A client program connecting to a web service can read the web service's WSDL file to determine what functions are available. Any special data types are embedded in the WSDL file in the form of XML schema. The client can then use SOAP to actually call one of the functions listed in the WSDL file.

Universal Description, Discovery, and Integration (UDDI) refers to Web-based registries that may be used to discover WSDL files for web services. The data in the registry can be categorized to aid discovery. SOAP calls to a UDDI registry can be used to discover information about registered web services.

SUMMARY OF THE INVENTION

Some embodiments of the present invention provide systems, methods and computer program products that support web services in a managed object space. A web service object is identified in a common information model of a resource management system, the web service object corresponding to a web service. A model object manager of the resource management system receives a first query from a client, generates a second query for a web service object provider associated with the web service object responsive to the received first query and transmits the second query to a web service object provider. The web service object provider receives the second query, generates a corresponding web service request message and transmits the web service request message to the web service. Some embodiments provide computer program products and systems configured to perform the above-described methods.

The web service object provider may map data types and operations of the web service object to data types and methods, respectively, of the web service. For example, the web service object provider may load a normalization file that correlates data types and methods of the web service object to data types and operations of the web service, and may map the data types and operations of the web service object based on the loaded normalization file.

In further embodiments, the web service object provider receives a web service response message corresponding to the web service request message from the web service, generates a first response responsive to the received web service response message and transmits the first response to the model object manager. The model object manager generates a second response responsive to the received first response and transmits the second response to the client.

Additional embodiments of the present invention provide systems, methods and computer program products that support provision of web services from an object-oriented resource management system. A web services description of an operation of an object of a common information model of the resource management system is generated. A web service server proxy receives a web services request message conforming to the web services description, generates a first query responsive to the received web service request message, and transmits the first query to a model object manager of the resource management system. The model object manager receives the first query, generates a second query responsive to the first query, and transmits the second query to an object provider for the object. The model object manager receives a first response to the second query from the object provider, generates a second response to the first query responsive to the received first response and transmits the second response to the web service server proxy. The web service server proxy receives the second response, generates a web service response message responsive to the received second response, and transmits the web service response message.

The web services description of an operation of an object of a common information model of the resource management system may be a Web Services Definition Language (WSDL) file generated from a Managed Object File (MOF) for a class of the common information model. The WSDL file may be registered in a Universal Description, Discovery, and Integration (UDDI) registry.

DESCRIPTION OF EMBODIMENTS OF THE PRESENT INVENTION

Figure 1:
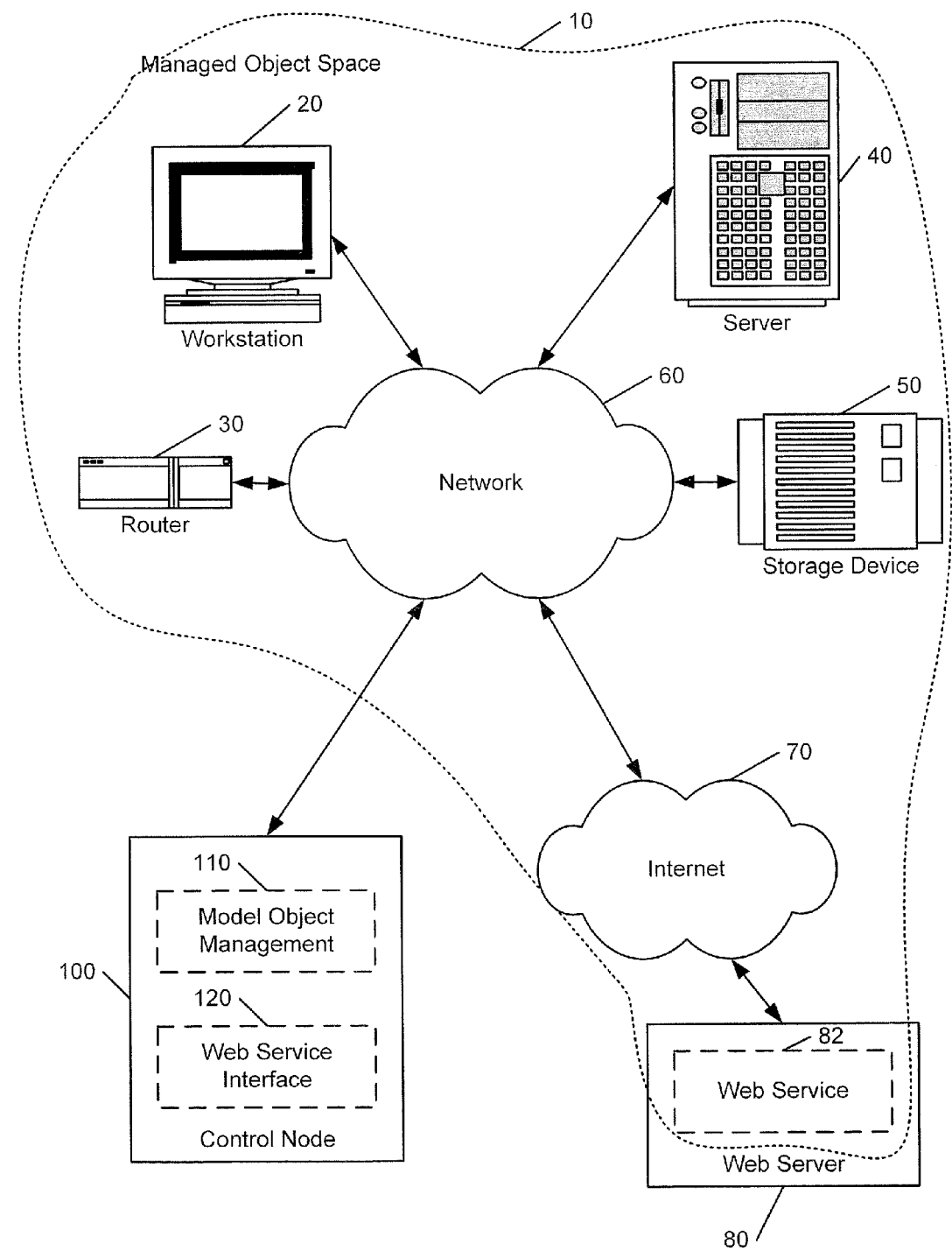
FIG. 1 is a schematic diagram illustrating a managed object environment according to some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as Java® or C++. However, the computer program code for carrying out operations of the present invention may also be written in conventional procedural programming languages, such as the "C" programming language or assembly language. The program code may execute entirely on the user's computer, partly on the user's computer, as a stand-alone software package, partly on the user's computer and partly on a remote computer, or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

According to some embodiments of the present invention, web services may be exposed to clients in a managed object space, such as that conforming to the NetIQ Management Services common information model. For example, a web service object provider may be created that generates appropriate SOAP messages to a web service in response to queries from an object manager of the manage object space, and converts responses received from the web server into appropriate responses to the object manager.

According to further embodiments of the present invention, proprietary services objects from a managed object space may be converted and exposed as web services, with appropriate WSDL. In some embodiments, this may be done dynamically at run-time. For example, objects having a MOF description may be converted and exposed as web services with appropriate WDSL. An application may be provided that parses signed MOF files and produces valid WDSL, which in turn may be registered and made available to web services consumers.

According to further embodiments of the present invention, proprietary services may be discovered through interrogation of a proprietary registry provider method and may be registered and advertised through a web registry. For example, NetIQ IQConnect-based services may be discovered through interrogation of a Provider Registry Provider (PRP), a NetIQ-proprietary method for registering IQConnect services, and such services may be registered and advertised through a UDDI Registry. An object-oriented method may be provided to convert the proprietary service definitions to standardized definitions (e.g., UDDI definitions). Such a method may be used in conjunction with a web services client proxy, which may allow designated proprietary services to be consumed as web services by standard web services clients.

FIG. 1 illustrates systems and operations supporting interaction of web services with a managed resource environment according to some embodiments of the present invention. A network 60 supports communications among devices, such as a workstation 20, router 30, server 40 and storage device 50. The devices may be configured, alone and/or in combination, to execute applications for monitoring resources on the computer network and providing data from such monitoring to, for example, a network management system. The network 60 may include a plurality of separate linked physical communication networks, which, using a protocol such as the Internet protocol (IP), may appear to be a single seamless communications network to user application programs. It is further to be understood that, although FIG. 1 illustrates the network 60 as a single entity, it may include multiple interconnected physical networks.

Regarding network management, as further illustrated, the devices 20, 40, 30, 50 and/or processes resident thereat may form part of a managed object space 10 that may be modeled according to a common information model (CIM) that is managed using operations of a control node 100 that includes a model object management function 110. For example, the managed object space 10 may conform to NetIQ Corporation's IQCIM or other common information model, and the model object management function 10 may be provided by NetIQ's IQConnect Server or other model object manager providing functions analogous to the CIM Object Manager (CIMOM).

According to some embodiments of the present invention, the managed object space 10 may include a web service 82, here shown as resident at a web server 80 that communicates with the network 60 via the Internet 70. The control node 100 may include a web service interface application 120 that is configured to support exposure of the web service 82 as a managed object in the managed object space 10.

Figure 2:
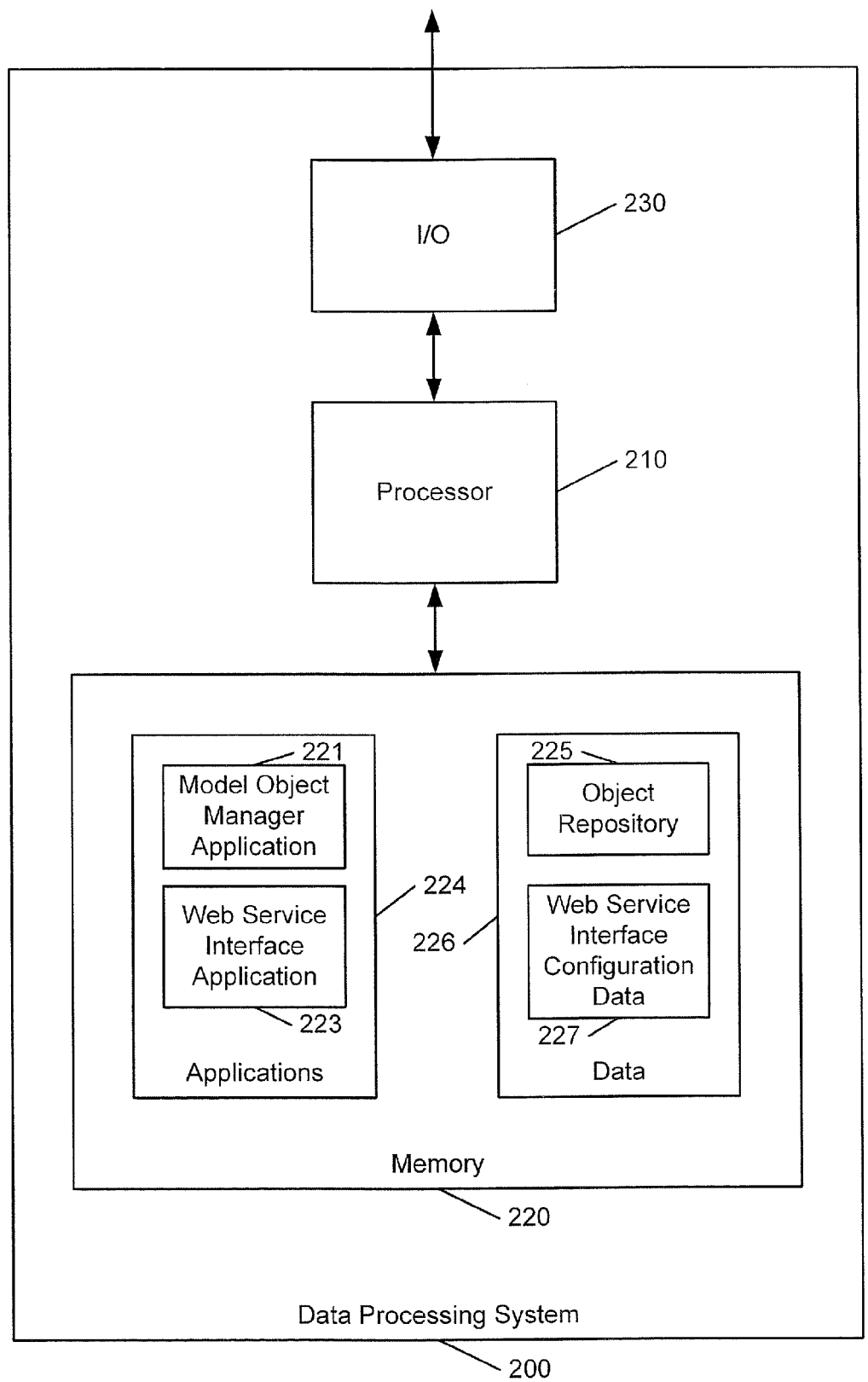
FIG. 2 is a schematic diagram illustrating a data processing system and operations according to some embodiments of the present invention.

FIG. 2 illustrates an exemplary embodiment of a data processing system 200 for supporting such operations in accordance with some embodiments of the present invention. The data processing system 200 typically includes a processor 210 that is configured to interoperate with a memory 220 and I/O circuitry 230. Generally, the processor 210, memory 220 and I/O circuitry 230 may be physically located in a single device or may be distributed across multiple devices in a network. These components may be conventional components, such as those used in many conventional data processing systems, which may be configured to operate as described herein.

As further illustrated in FIG. 2, information stored in the memory 220 may include applications 224 and data 227. The applications 224 may include a model object manager application 221 that is configured to perform operations of an object manager in a managed object space, and a web service interface application 223, which is configured to support interface of web services to the managed object space managed by the model object manager application 221. The data 226 may include an object repository 225, which includes information on classes, properties, operations and other information of the managed object space, and web service interface configuration data 227, which may include information for mapping web service data types and methods to corresponding data types and methods of the managed object space.

Figure 3:
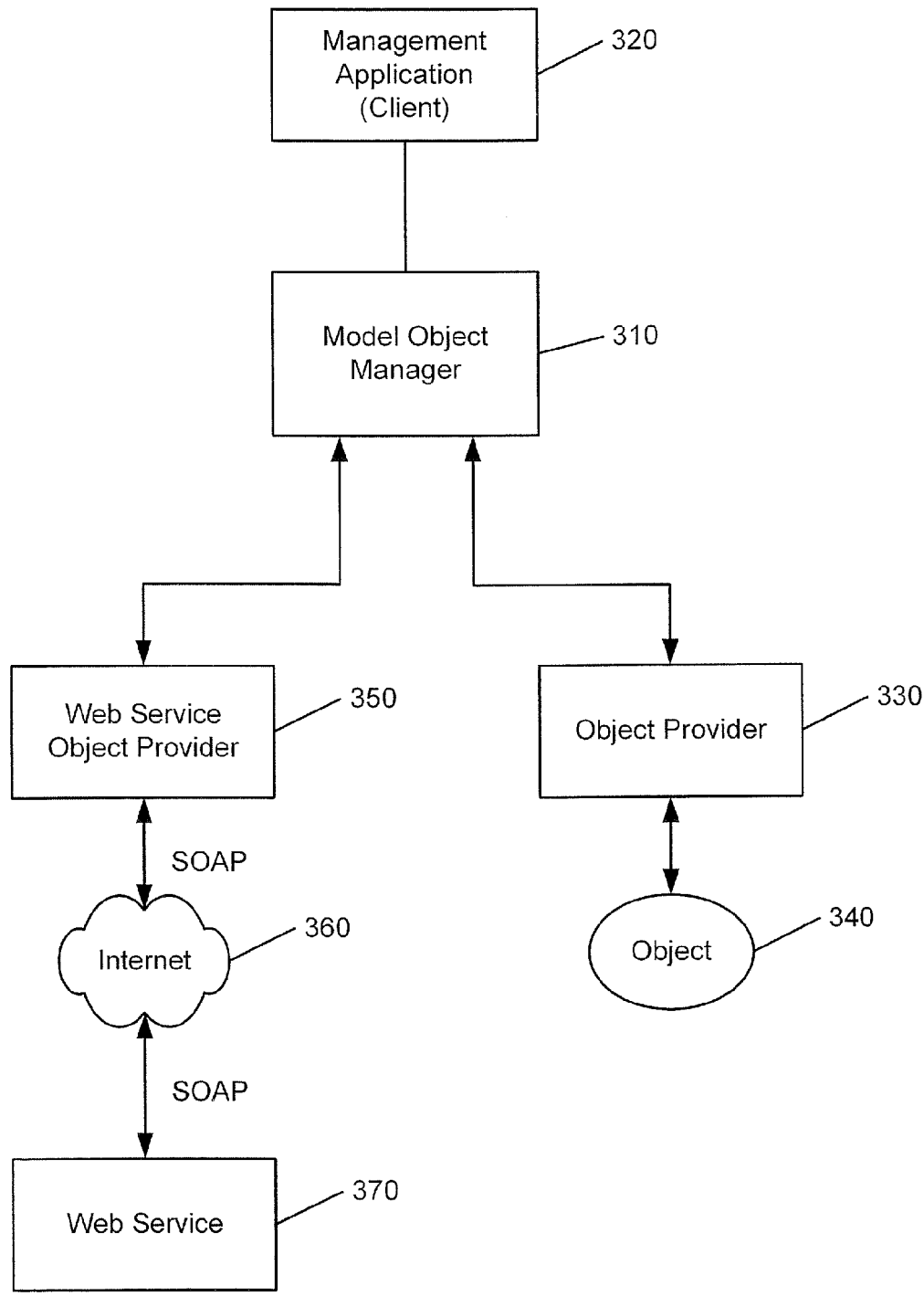
FIG. 3 is a schematic diagram illustrating an architecture and operations for delivering web services in a managed object environment according to some embodiments of the present invention.

FIG. 3 illustrates an exemplary architecture and operations for exposing a web service in a managed object environment according to some embodiments of the present invention. Clients, such as a management application 320, provide queries to and receive responses from a model object manager 310. The model object manager 310 is configured to receive queries from clients and to send and receive appropriate queries and responses to and from various object providers, such as a provider 330 that serves a managed object 340 (e.g., a physical or logical entity) in the managed object environment.

Figure 4:
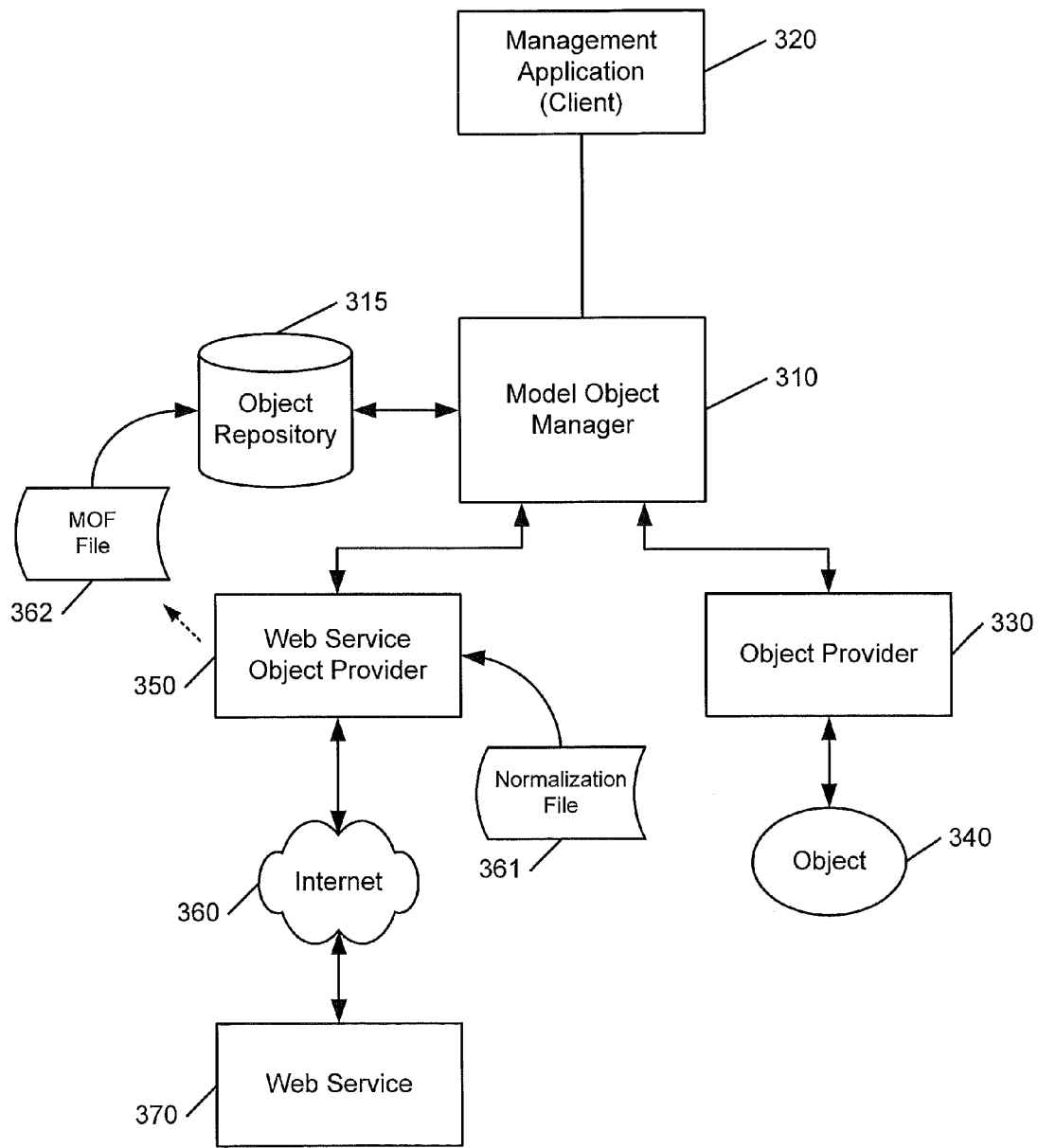
FIG. 4 is a schematic diagram illustrating an architecture and operations for delivering web services in a managed object environment according to further embodiments of the present invention.

As further illustrated, a special-purpose web service object provider 350 may be created to provide a similar interaction with a web service 370. In particular, the web service object provider 350 may be configured to map queries and responses in the managed object domain to appropriate SOAP messages that are sent to or received from the web service 370. For example, referring to FIG. 4, the web service object provider 350 may have an associated manage object format (MOF) file 362 that may be compiled to register the web service object provider 350 in an object repository that is accessed by the model object manager 310. As further shown, in order to provide mapping of web service data types and operations to the managed object data types and methods, the web service object provider 350 may load configuration information stored in a normalization file 361 that provides such mapping.

Figure 5:
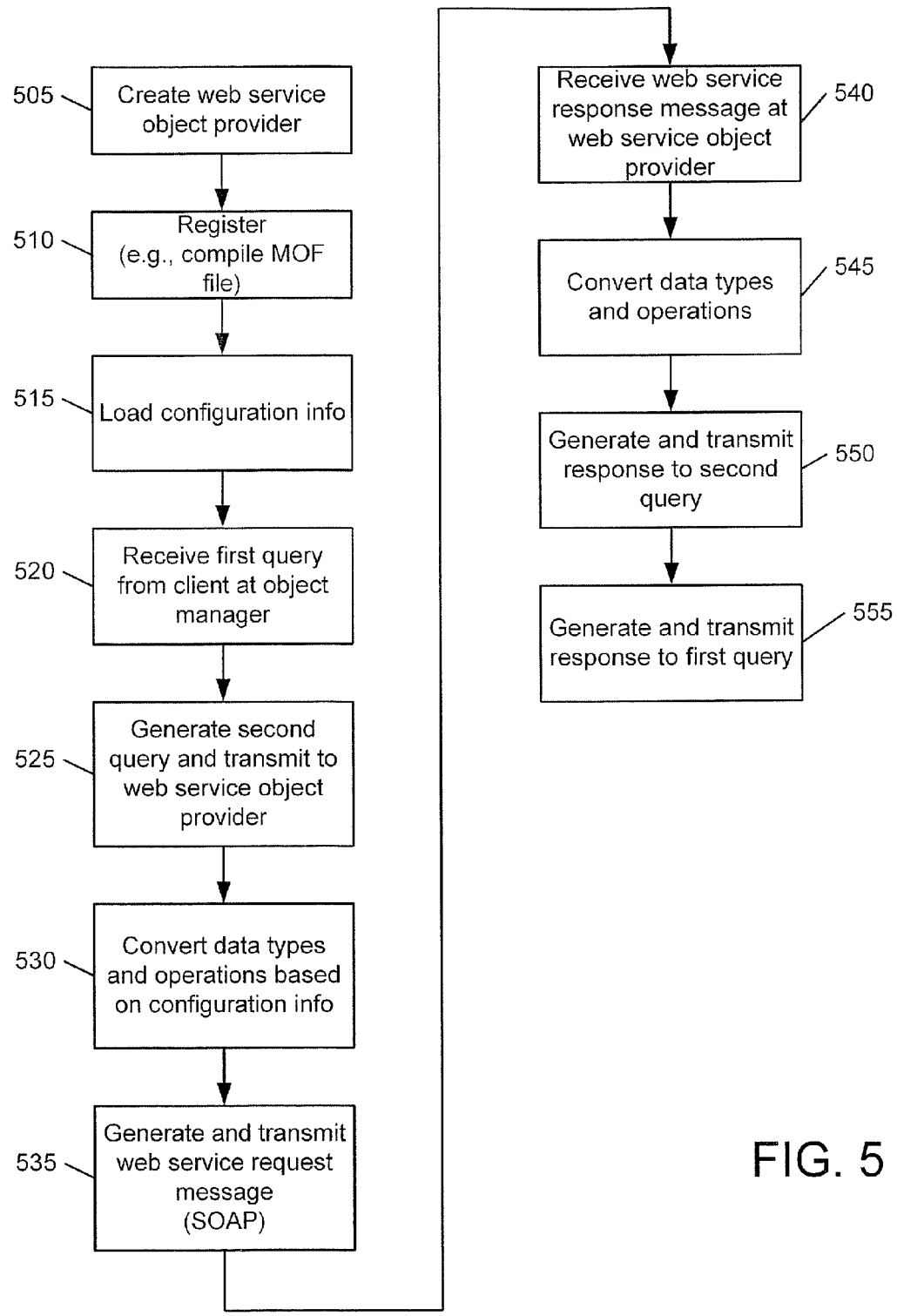
FIG. 5 is a flow chart illustrating exemplary operations for delivering web services in a managed object environment according to some embodiments of the present invention.

FIG. 5 is a flowchart illustrating exemplary operations for exposing a web service in a managed object environment. A web service object provider is created (block 505) and registered in the object repository by compiling an associated MOF file (block 510). Configuration information from normalization file is loaded (block 515). A first query from a client is received at the model object manager (block 520). The model object manager, with appropriate reference to the object repository, generates a second query and transmits it to the web service object provider (block 525). In some embodiments of the invention, the second query may be identical or substantially identical to the first query, such that the model objection manager may be view as forwarding the first query to the web service object provider. However, in some embodiments of the present invention, the second query may vary from the first query. Based on the loaded configuration information, the web service object provider converts data types and operations, generates an appropriate web service request (e.g., SOAP) message corresponding to the second query, and transmits the web service request to the web service (block 535).

In response to receipt of a corresponding web service response (block 540), the web service object provider converts data types and operations according to the loaded configuration information (block 545). The web service object provider then generates and transmits a response to the second query to the model object manager (block 550), which responsively transmits a response to the first query from the client (block 555). Similarly to the queries discussed above, the response sent from the model object manager to the client may be identical to, substantially identical to or different from the response transmitted from the web service object provider to the model object manager.

Figure 6:
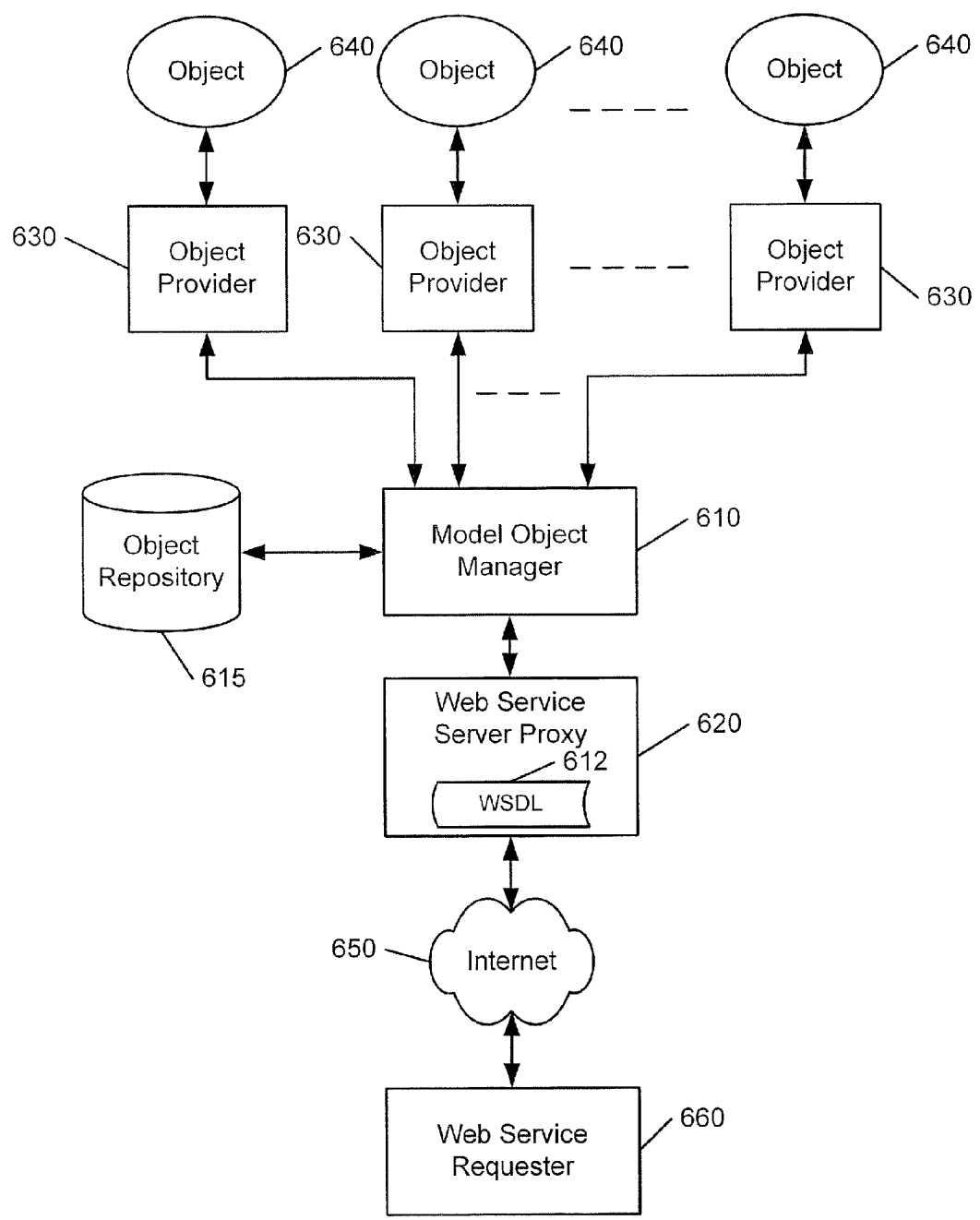
FIG. 6 is a schematic diagram illustrating an architecture and operations for exposing managed objects in a web services context according to some embodiments of the present invention.

According to further aspects of the present invention, objects from a managed object space may be exposed as web services. FIG. 6 illustrates an exemplary architecture and operations according to some embodiments of the present invention. A model object manager 610 is configured to interact with object providers 630 that are associated with respective managed objects 640. The model object manager 610 accesses information about the managed objects 640 in an object repository 615.

A web service server proxy 620 is configured to second queries and receive responses to and from the model object manager 620. The web service server proxy 620 is configured to provide translation between web service requests and responses conveyed over the internet 650 from and to a web service requester 660 and queries and responses provided to the model object manager 610. The web service server proxy 620 may have an associated WSDL file 612 that corresponds to one or more of the managed objects 640, which allows the web service requester 660 to determine the data types and operations of the corresponding object(s) as if the object were a web service.

Figure 7:
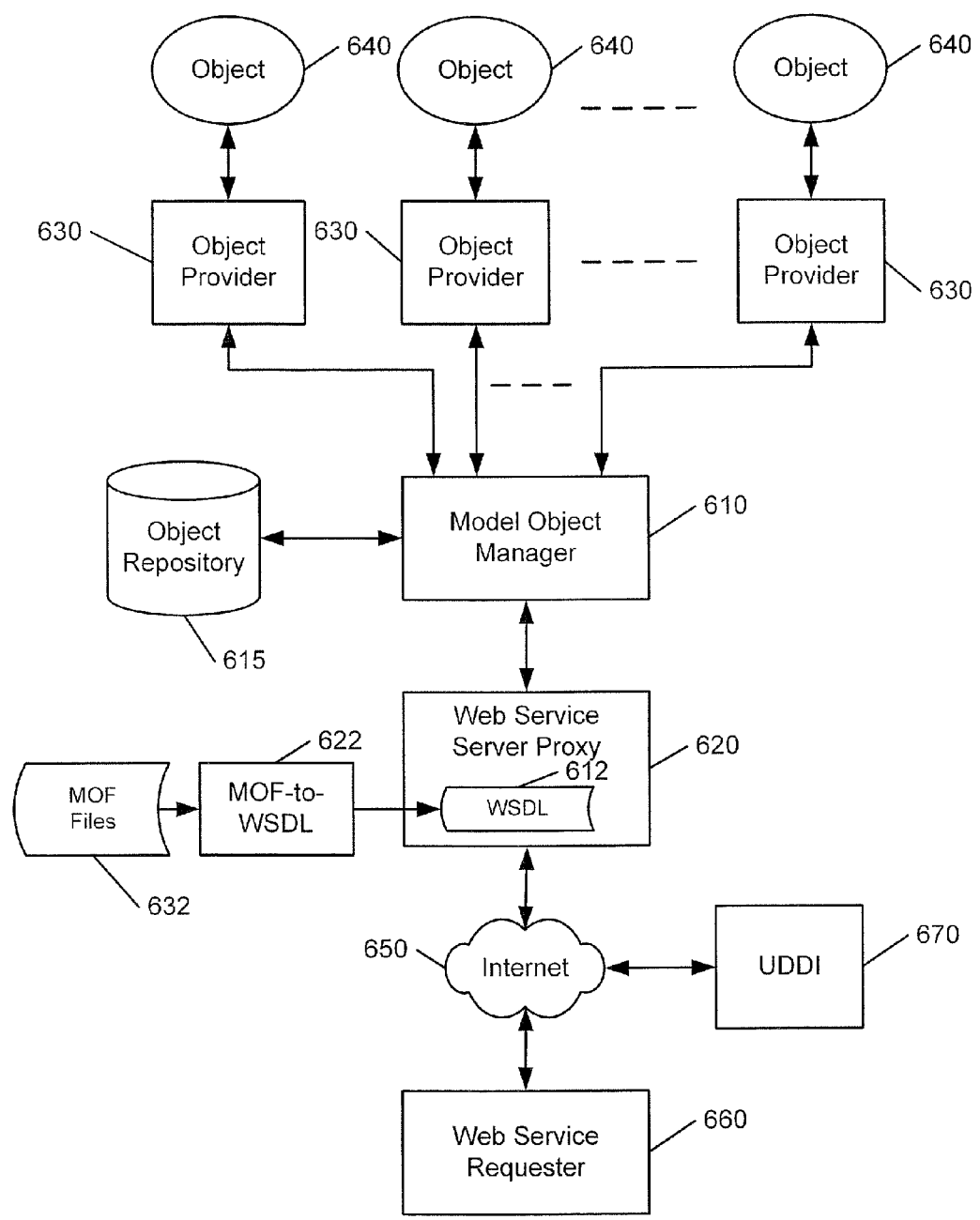
FIG. 7 is a schematic diagram illustrating an architecture and operations for exposing managed objects as web services according to further embodiments of the present invention.

As shown in FIG. 7, a MOF to WSDL application 622 may, for example, translate MOF file(s) 632 corresponding to the managed objects to one or more WSDL files 612, which may be registered with a UDDI registry 670. The methods and data types of the web service may be compliant with or conform to an invariant representation enforced by the common information model for the managed object space. For example, the managed object space may be viewed as a single web service having XML schema corresponding to various data types of the managed objects, and an associated set of operations that correspond to respective methods supported by the managed objects. In other embodiments, respective managed objects may be treated as respective web services, e.g., respective WSDL files may be generated for the respective managed objects. For example, the MOF to WSDL application 622 may receive the following MOF description of a class "Policy":

```
class Policy : PolicyTemplate {
    int policyId;
    string policyName;
    listPolicyResult(
        [in(required,true)]  int policyId,
        [in(required,true)]  int groupId,
        [out]                int[ ] computers);
};
```

In response, the MOF-to-WSDL application 622 may generate the following WSDL:

```
<?xml version="1.0" encoding="UTF-8"?>
<wsdl:definitions
  xmlns:iqns="http://data.ws.netiq.com/">
  <wsdl:types>
    <xsd:element name="listPolicyResult">
      <xsd:complexType>
        <xsd:sequence>
          <xsd:element name="policyId" type="xsd:int" />
          <xsd:element name="groupId" type="xsd:int" />
        </xsd:sequence>
      </xsd:complexType>
    </xsd:element>
    <xsd:element name="listPolicyResultResponse">
      <xsd:complexType>
        <xsd:sequence>
          <xsd:element name="policyResponseArray"
              type="iqns:ArrayOfCompliantComputers" />
        </xsd:sequence>
      </xsd:complexType>
    </xsd:element>
    <xsd:element name="ArrayOfCompliantComputers">
      <xsd:complexType>
        <xsd:sequence>
          <xsd:element name="computerId" type="xsd:int" />
          <xsd:element name="computerName" type="xsd:string" />
          <xsd:element name="computerType" type="xsd:string" />
          <xsd:element name="risk" type="xsd:int" />
          <xsd:element            name="lastInCompliance" type="xsd:string" />
          <xsd:element name="lastInComplianceDateTime"
              type="xsd:long" />
          <xsd:element name="lastUpdate" type="xsd:long" />
          <xsd:element name="kpi" type="xsd:long" />
        </xsd:sequence>
      </xsd:complexType>
    </xsd:element>
  </wsdl:types>
  <wsdl:message name="listPolicyRequest">
    <wsdl:part                element="tns:listPolicyRequest"
        name="parameters" />
  </wsdl:message>
  <wsdl:message name="listPolicyResponse">
    <wsdl:part                element="tns:listPolicyResponse"
        name="parameters" />
  </wsdl:message>
  <wsdl:portType name="IQServicePortType">
    <wsdl:operation name="listPolicyResult">
      <wsdl:input message="tns:listPolicyRequest"
          name="listPolicyRequest" />
      <wsdl:output message="tns:listPolicyResponse"
          name="listPolicyResponse" />
    </wsdl:operation>
  </wsdl:portType>
  <wsdl:binding                   name="IQServiceHttpBinding"
      type="IQServicePortType">
    <wsdlsoap:binding style="document" />
    <wsdl:operation name="listPolicyResult">
      <wsdl:input name="listPolicyRequest">
        <wsdlsoap:body use="literal" />
      </wsdl:input>
      <wsdl:output name="listPolicyResponse">
        <wsdlsoap:body use="literal" />
      </wsdl:output>
    </wsdl:operation>
  </wsdl:binding>
  <wsdl:service name="IQService">
    <wsdl:port                 binding="tns:IQServiceHttpBinding"
        name="IQServiceHttpPort">
      <wsdlsoap:address
          location="http://wstest.netiq.com/ws/services/PolicyService" />
    </wsdl:port>
  </wsdl:service>
</wsdl:definitions>
```

Figure 8:
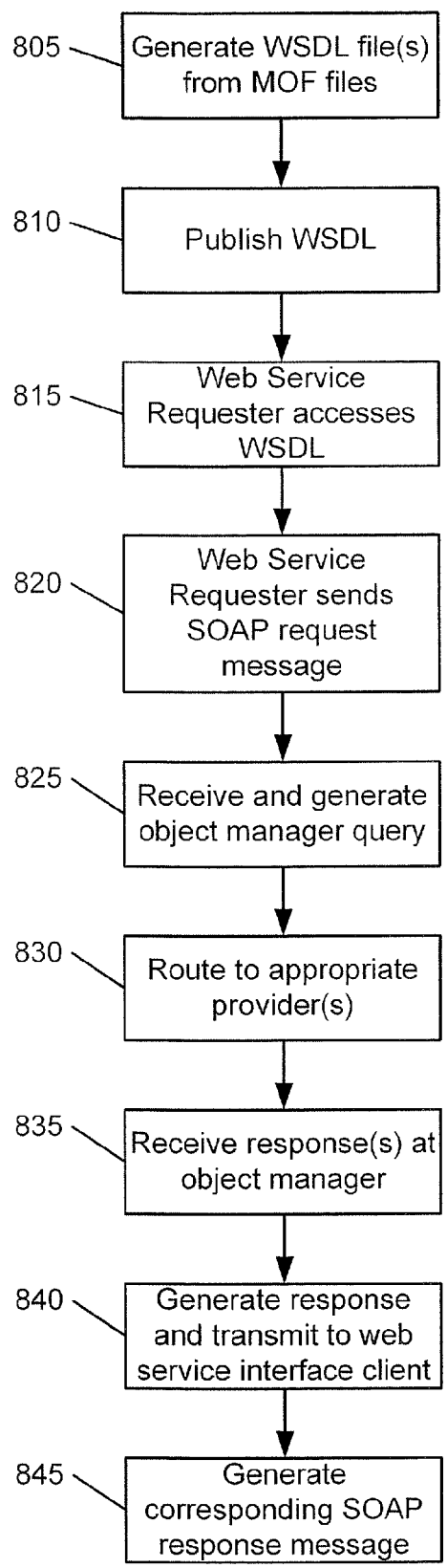
FIG. 8 is a flow chart illustrating exemplary operations for exposing managed objects as web services according to some embodiments of the present invention.

FIG. 8 illustrates exemplary operations in support of exposing managed objects as web services according to some embodiments of the present invention. One or more WSDL files are generated responsive to MOF file information (block 805). The WSDL is published and registered in a UDDI registry (block 810). A web service requester subsequently accesses the published WSDL (block 815) and sends an appropriate web service SOAP request message (block 820). The web service server proxy receives the SOAP message and generates a corresponding query to the model object manager (block 825). The object manager generates one or more corresponding messages and routes them to object providers (block 830), and receives one or more corresponding responses (block 835). The object manager forwards a response to the web service server proxy (block 840), which responsively generates and transmits an appropriate web service response (block 845).

It will be understood that the block diagrams and flowcharts of FIGS. 1-8 may be implemented using discrete and integrated electronic circuits. It will also be appreciated that block diagram of FIGS. 1-8 may be implemented using components other than those illustrated in FIGS. 1-8, and that, in general, various blocks of the block diagrams and flow charts may be implemented in special purpose hardware such as discrete analog and/or digital circuitry, combinations of integrated circuits or one or more application specific integrated circuits (ASICs).

Accordingly, blocks of the block diagrams and flowcharts of FIGS. 1-8 support electronic circuits and other means for performing the specified operations, as well as combinations of operations. It will be understood that the circuits and other means supported by each block and combinations of blocks can be implemented by special purpose hardware, software or firmware operating on special or general-purpose data processors, or combinations thereof. It should also be noted that, in some implementations, the operations noted in the blocks may occur out of the order noted in the figures. For example, two blocks shown in succession may, in fact, be executed substantially concurrently, or the blocks may sometimes be executed in the reverse order.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A method of operating a resource management system to support web services, the method comprising:
    identifying a web service object in a common information model of the resource management system, the web service object corresponding to a web service;
    a model object manager of the resource management system receiving a first query from a client;
    the model object manager generating a second query for a web service object provider associated with the web service object responsive to the received first query;
    the model object manager transmitting the second query to a web service object provider;
    the web service object provider receiving the second query;
    the web service object provider generating a corresponding web service request message;
    the web service object provider transmitting the web service request message to the web service;
    the web service object provider receiving a web service response message corresponding to the web service request message from the web service;
    the web service object provider generating a first response responsive to the received web service response message;
    the web service object provider transmitting the first response to the model object manager;
    the model object manager generating a second response responsive to the received first response; and
    the model object manager transmitting the second response to the client.

2. The method of claim 1, wherein the web service object provider generating a corresponding web service request message comprises the web service object provider mapping data types and operations of the web service object to data types and methods, respectively, of the web service.

3. The method of claim 2, wherein the web service object provider mapping data types and operations of the web service object to data types and methods, respectively, of the web service is preceded by the web service object provider loading a normalization file that correlates data types and methods of the web service object to data types and operations of the web service, and wherein the web service object provider mapping data types and operations of the web service object to data types and methods, respectively, of the web service comprises the web service object provider mapping the data types and operations of the web service object based on the loaded normalization file.

4. A method of providing web services from an object-oriented resource management system, the method comprising:
    generating a Web Services Definition Language (WSDL) file from a Managed Object File (MOF) for a class of the common information model;
    publishing the WDSL file;
    a web service server proxy receiving a web services request message conforming to a web services description included in the published WDSL file;
    the web service server proxy generating a first query responsive to the received web service request message;
    the web service server proxy transmitting the first query to a model object manager of the resource management system;
    the model object manager receiving the first query;
    the model object manager generating a second query to an object provider of the resource management system responsive to the first query;
    the model object manager receiving a first response to the second query from the object provider;
    the model object manager generating a second response to the first query responsive to the received first response;
    the model object manager transmitting the second response to the web service server proxy;
    the web service server proxy receiving the second response;
    the web service server proxy generating a web service response message responsive to the received second response; and
    the web service server proxy transmitting the web service response message.

5. The method of claim 4, further comprising registering the WSDL file in Universal Description, Discovery, and Integration (UDDI) registry.

6. A system comprising:
a processor;
a memory operatively coupled to the processor;
a web service object provider registered in an object repository of a resource management system and configured to interface a model object manager to a web service such that the web service is accessible as a web service object in a common information model of the resource management system; and
a model object manager,
wherein the model object manager is configured to receive a first query from a client, to generate a second query for a web service object provider associated with the web service object responsive to the received first query and to transmit the second query to a web service object provider;
wherein the web service object provider is configured to receive the second query, to generate a corresponding web service request message and to transmit the web service request message to the web service,
wherein the web service object provider is further configured to receive a web service response message corresponding to the web service request message from the web service, to generate a first response responsive to the received web service response message, and to transmit the first response to the model object manager; and
wherein the model object manager is configured to generate a second response responsive to the received first response and to transmit the second response to the client.

7. The system of claim 6, wherein the web service object provider is configured to map data types and operations of the web service object to data types and methods, respectively, of the web service.

8. The system of claim 7, wherein the web service object provider is configured to loading a normalization file that correlates data types and methods of the web service object to data types and operations of the web service and to map data types and operations of the web service object to data types and methods, respectively, of the web service based on the loaded normalization file.

9. A system comprising:
a processor;
a memory operatively coupled to the processor; and
a web service server proxy having an associated published Web Services Definition Language (WSDL) file including a web services description of an operation of an object of a common information model of a resource management system;
a conversion application configured to generate the Web Services Definition Language (WSDL) file from a Managed Object File (MOF) for a class of the common information model; and
a model object manager for the common information model of the resource management system,
wherein the web service server proxy is configured to receive a web services request message conforming to the web services description to generate a first query responsive to the received web service request message and to transmit the first query to the model object manager,
wherein the model object manager is configured to generate a second query responsive to the first query and to transmit the second query to an object provider for the object, to receive a first response to the second query from the object provider, to generate a second response to the first query responsive to the received first response and to transmit the second response to the web service server proxy, and
wherein the web service server proxy is further configured to receive the second response, to generate a web service response message responsive to the received second response and to transmit the web service response message.

* * * * *